US008836481B2

(12) United States Patent
Schaffler

(10) Patent No.: US 8,836,481 B2
(45) Date of Patent: Sep. 16, 2014

(54) TRANSPONDERS AND METHODS FOR OPERATING A TRANSPONDER

(75) Inventor: Gerald Schaffler, Graz (AT)

(73) Assignee: Quotainne Enterprises LLC, Wilmington, DE (US)

( * ) Notice: Subject to any disclaimer, the term of this patent is extended or adjusted under 35 U.S.C. 154(b) by 889 days.

(21) Appl. No.: 12/522,184

(22) PCT Filed: Dec. 19, 2007

(86) PCT No.: PCT/IB2007/055228
§ 371 (c)(1),
(2), (4) Date: Jul. 6, 2009

(87) PCT Pub. No.: WO2008/084353
PCT Pub. Date: Jul. 17, 2008

(65) Prior Publication Data
US 2010/0073143 A1 Mar. 25, 2010

(30) Foreign Application Priority Data

Jan. 8, 2007 (EP) ..................................... 07450003

(51) Int. Cl.
*G06K 7/00* (2006.01)
*G06K 19/07* (2006.01)
*G06K 7/10* (2006.01)

(52) U.S. Cl.
CPC .......... *G06K 19/0723* (2013.01); *G06K 7/0008* (2013.01); *G06K 7/10079* (2013.01)
USPC .......... 340/10.4; 235/375; 343/745; 343/750; 343/861

(58) Field of Classification Search
None
See application file for complete search history.

(56) References Cited

U.S. PATENT DOCUMENTS

| 6,097,301 | A | 8/2000 | Tuttle | |
|---|---|---|---|---|
| 6,362,738 | B1 | 3/2002 | Vega | |
| 6,781,508 | B2 * | 8/2004 | Tuttle et al. | 340/10.1 |
| 7,339,481 | B2 * | 3/2008 | Duron | 340/572.7 |
| 7,592,961 | B2 * | 9/2009 | Thober et al. | 343/745 |
| 2002/0127970 | A1 | 9/2002 | Martinez | |
| 2003/0080853 | A1 | 5/2003 | Tuttle et al. | |
| 2003/0122673 | A1 | 7/2003 | Anderson | |
| 2005/0237163 | A1 * | 10/2005 | Lee et al. | 340/10.51 |
| 2006/0055552 | A1 | 3/2006 | Chung et al. | |
| 2006/0214773 | A1 | 9/2006 | Wagner et al. | |

FOREIGN PATENT DOCUMENTS

| JP | 2000348270 A | 12/2000 |
|---|---|---|
| WO | 9943096 A1 | 8/1999 |
| WO | 2007/110964 A | 10/2007 |

OTHER PUBLICATIONS

"International Search Report for PCT/IB2007/055228 dated Apr. 17, 2008".

* cited by examiner

*Primary Examiner* — Daniel Wu
*Assistant Examiner* — John Bamert
(74) *Attorney, Agent, or Firm* — David C. Kellogg

(57) ABSTRACT

In a method for operating a transponder (1, 41), the transponder (1, 4) receives a signal from a transmitter (2, 42). The signal comprises an information about a reference sensitivity and the transponder (1, 41) has an input sensitivity such that the transponder (1, 41) detects only signals above a certain power corresponding to the input sensitivity. In response to the received signal, the input sensitivity of the transponder (1, 41) is adjusted to the reference sensitivity.

4 Claims, 3 Drawing Sheets

TRANSPONDERS AND METHODS FOR OPERATING A TRANSPONDER

FIELD OF THE INVENTION

The invention relates to transponders and to methods for operating a transponder.

BACKGROUND OF THE INVENTION

Transponders, which are also referred to as tags or labels, are well known in the art and are designed to communicate with a reader which is also known as a base station. Usually, the reader sends a signal to the transponder. If the transponder is close enough to the reader, i.e. if the power level of the signal generated by the reader is high enough so that the transponder can detect this signal, then the transponder receives this signal and may send, in response to the received signal, a signal to the reader.

Published U.S. application for patent No. 2006/0055552 A1 discloses a tag sending signals which comprise an information identifying itself and an information about the power level at which it sends the signals. The tag sends different signals at different power levels to a plurality of relay devices located at pre-defined locations. The plurality of relay devices are in communication with a tracking system. Depending on the power level of the signals, fewer or more relay devices receive the signals. The location of the tag can be determined from the receptions of the lowest power level transmission that is received by plural relay devices.

In some applications, for instance, when using a reader transponder system for mobile commerce, it may be desired that the transponder can only communicate with the reader within a certain distance or that this distance is flexible.

OBJECT AND SUMMARY OF THE INVENTION

It is an object of the present invention to provide an RFID transponder whose range of operation in respect to a reader is flexible.

It is a further object of the present invention to provide a method for operating a transponder which allows the transponder to have a flexible range of operation.

The object is achieved in accordance with the invention by means of a method for operating a transponder, comprising the steps of:
receiving a signal from a transmitter with a transponder having an input sensitivity such that the transponder detects only signals above a certain power corresponding to the input sensitivity; the signal comprising an information about a reference sensitivity; and
adjusting the input sensitivity to the reference sensitivity.

Alternatively, the signal received by the transponder may comprise an information about a distance within which the transponder shall be able to detect signals sent by the transmitter. Then, the input sensitivity of the transponder is adjusted so that the transponder detects only signals sent by the transmitter if the transponder is within the distance to the transmitter.

The object is also achieved in accordance with the invention by means of a transponder comprising a receiver to receive signals sent by a transmitter. The receiver has an input sensitivity such that the inventive transponder detects only signals above a certain power corresponding to its input sensitivity and the inventive transponder is configured to adjust the input sensitivity to a reference sensitivity in response to a received signal sent by the transmitter, wherein the received signal comprises an information about the reference sensitivity.

Alternatively, the received signal comprises an information about a distance within which the inventive transponder shall be able to detect signals sent by the transmitter, and the inventive transponder adjusts its input sensitivity so that it detects only signals sent by the transmitter if the inventive transponder is within this distance to the transmitter.

Normally, transponders are configured to respond to detected signals sent from the transmitter, for instance a reader. Depending on the power the transmitter sends the signals and the input sensitivity of the transponder, the transponder can detect signals within a certain range of operation around the transmitter, i.e. within a certain distance from the transmitter. The input sensitivity is determined, for instance, by an antenna of the transponder used to capture the transmitted signals and by a sensitivity of an electric circuit of the transponder. Conventional transponders have a fixed input sensitivity.

The inventive transponder, however, is configured to adjust its input sensitivity in response to an associated command sent by the transmitter. The command is the signal comprising the information about the reference sensitivity or the distance. Thus, after the inventive transponder has received this command, the range of operation for the inventive transponder is adjusted in accordance to the adjusted sensitivity. The inventive transponder may be an active or a passive transponder.

The inventive transponder may have a maximum sensitivity corresponding to a maximum distance within which the inventive transponder is physically capable of receiving signals sent by the transmitter. The information about the reference sensitivity may be a percentage of the maximum sensitivity.

Usually, transponders comprise antennas designed to capture signals intended for the transponder. The reference sensitivity may comprise an information about a reference threshold voltage for this antenna. Then, the inventive transponder may be configured to adjust its input sensitivity such that the inventive transponder detects only signals causing a voltage across its antenna above the reference threshold voltage.

As a result, the inventive transponder may be configured to compare the voltage across its antenna with the reference voltage. The voltage across the antenna is generated by a signal captured by the antenna. Only if the voltage across the antenna is greater than the reference voltage, then the electric circuit of the transponder processes the signal. Then, the transponder detects this signal.

For instance, a certain system comprised of a reader and the inventive transponder has currently a certain range of operation, for instance, 6 meters around the reader. This range of operation may correspond to the maximum sensitivity or may correspond to a default reference voltage. Then, an electric circuit, for instance an integrated circuit, may compare the voltage of the transponder voltage with the default threshold voltage. If the voltage at the antenna is above the default threshold voltage, then the electric circuit may process the signals captured by the antenna and, if required, generate a response signal in response to the processed signal.

If the inventive transponder is within this range of operation, then the power of a signal sent from the reader causes a certain antenna voltage across the transponder antenna. The antenna voltage is greater than the threshold voltage as long as the transponder is within the range of operation so that the inventive transponder detects this signal.

If the signal comprises an information about a reference sensitivity, particularly an information about a threshold voltage, then the inventive transponder adjusts its input sensitivity to this reference sensitivity. Then, for instance, the inventive transponder may only detect and thus respond to signals causing an antenna voltage above the reference voltage. If, for example, the reference voltage is greater than the actual threshold voltage, then the range of operation of the inventive transponder is reduced. If, for instance, the inventive transponder was within the range of operation associated with the default reference voltage before receiving the signal comprising the information about the reference voltage, but outside the range of operation associated with the reference voltage, then the inventive transponder is too far away to communicate with the reader after having adjusted its input sensitivity to the reference sensitivity.

If the inventive transponder is then brought within the range of operation associated with the reference voltage, then the inventive transponder can again detect signals sent from the reader. Then, the inventive transponder can also receive a further command to adjust again its input sensitivity, for instance, to a higher input sensitivity. Then, the inventive transponder can communicate with the reader within a range of operation associated with the higher input sensitivity.

The inventive transponder may also comprise a reset function which, when activated, sets the input sensitivity to the highest input sensitivity possible. This may be achieved by a special reset signal sent by the reader. Then, the inventive transponder may be configured to process the reset signal even though it causes, for instance, a smaller voltage at the antenna than the current threshold voltage.

In one embodiment of the inventive method, an ambient attenuation of signals to be detected by the transponder is detected and the input sensitivity of the transponder is adjusted so that the input sensitivity corresponds to the reference sensitivity without ambient attenuation.

Depending on devices or materials in the vicinity of the inventive transponder, the signals sent by the transmitter may be attenuated differently. For instance, if a transponder is attached on a first device, for example, a parcel, then the signals for the transponder may be attenuated by parcels located next to the parcels the transponder is attached to. Then, the inventive transponder may comprise a device for detecting an ambient attenuation of signals to be detected by the transponder and the inventive transponder may be configured to adjust its input sensitivity so that the attenuation is compensated. The inventive transponder may detect the attenuation by transmitting signals and evaluating a corresponding measured impedance. The compensation may be carried out by increasing the threshold voltage for the antenna accordingly.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

Figure 1:
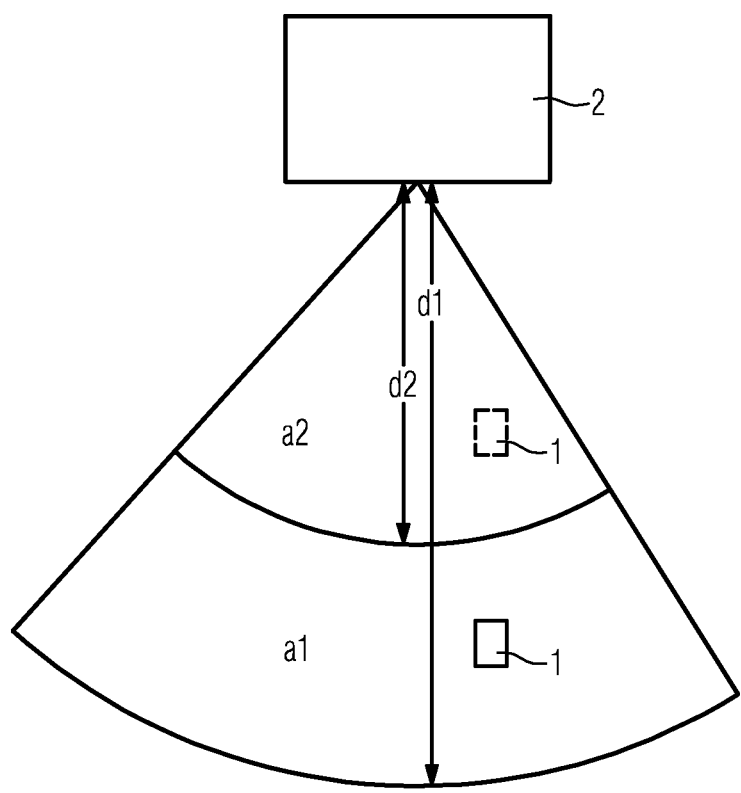
FIG. 1 shows in principle an RFID transponder and a reader.

FIG. 1 shows an RFID transponder 1 and a reader 2. For the exemplary embodiment, the reader 2 represents a point of sale terminal and the transponder 1 is a price label attached on a product (not explicitly shown in the figures). The price label may be used to register the product by the point of sale terminal for setting up an invoice. The transponder 1 is preferably a passive, but may also be an active transponder.

Figure 2:
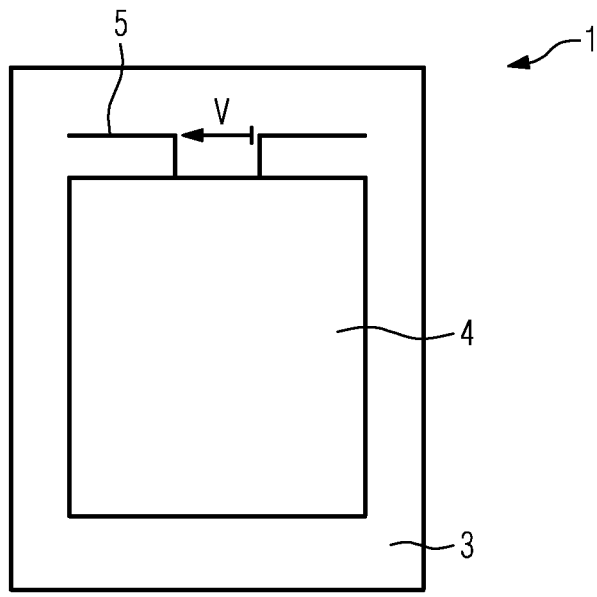
FIG. 2 shows the transponder of FIG. 1 in greater detail.

The transponder 1, which is shown in FIG. 2 in greater detail, comprises a substrate 3, an electric circuit which is an integrated circuit 4 for the exemplary embodiment, and an antenna 5 which may particularly be a dipole antenna. An advantage of a dipole antenna especially for UFH systems is its relative high read range. The integrated circuit 4 and the antenna 5 are attached to the substrate 3. The antenna 5 is designed to capture signals sent from the reader 2 and is connected to the integrated circuit 4. The integrated circuit 4 is designed to process signals captured by the antenna 5 and to generate signals in response to received signals. The signals generated by the integrated circuit 4 may be intended for the reader 2.

When the transponder 1 receives signals, for instance, sent by the reader 2, then a voltage V is generated at the transponder antenna 5. Depending on the antenna 5, the power of the signals sent by the reader 2, and a distance d1, d2 the transponder 1 is placed apart from the reader 2, the voltage V across the antenna 5 differs.

For the exemplary embodiment, the integrated circuit 4 is designed to detect only signals corresponding to voltages V across the antenna 5 above a certain threshold voltage $V_t$ which can be adjusted by the integrated circuit 4. For the exemplary embodiment, the current threshold voltage is a first threshold voltage, $V_{t,1}$, and is such that the transponder 1 can detect signals sent from the reader 2, if the transponder 1 is within a first range of operation a1. Then, signals sent by the reader 2 causes a voltage V across the antenna 5 greater than the current threshold voltage $V_{t,1}$, if the transponder 1 is maximally placed apart from the reader 2 by the distance d1.

Figure 3:
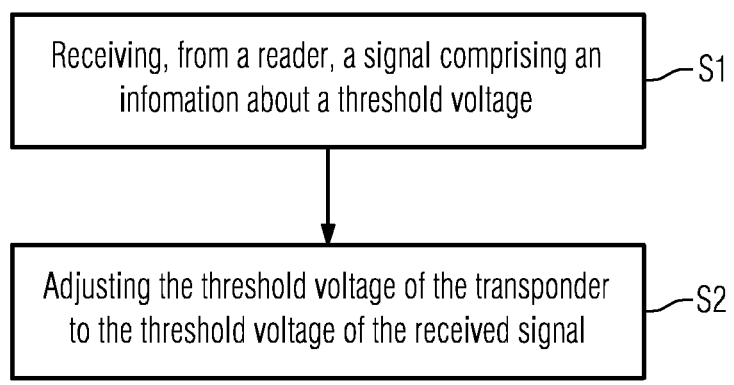
FIG. 3 shows a flow chart illustrating the mode of operation of the transponder of FIGS. 1 and 2.

FIG. 3 shows a flow chart illustrating a method of operation of the transponder 1.

For the exemplary embodiment, the transponder 1 is initially inside of the first range of operation a1 but outside of a second range of operation a2, has the first threshold voltage $V_{t,1}$ so that it can detect signals sent by the reader 2 up to the first distance d1. The second range of operation a2 corresponds to the second distance d2 from the reader 2. The second distance d2 is less than the first distance d1.

The reader 2 sends a signal which is detected by the integrated circuit 4, because this signal causes a voltage V across the transponder antenna 5 greater than the first threshold voltage $V_{t,1}$. For the exemplary embodiment, this signal comprises an information about a second threshold voltage $V_{t,2}$ (step S1 of the flow chart of FIG. 3).

Then, the integrated circuit 4 of the transponder 1 retrieves the information about the second threshold voltage $V_{t,2}$ from the detected signal. In response to the information about the second threshold voltage $V_{t,2}$, the integrated circuit 4 adjusts itself such that it does only process from now on signals captured by the antenna 5 causing a voltage V at the antenna 5 above the second threshold voltage $V_{t,2}$, (step S2 of the flow chart of FIG. 3).

For the exemplary embodiment, the second threshold voltage $V_{t,2}$ corresponds to the second distance d2 from the reader 2 so that the transponder 1 can only detect signals sent by the reader 2 if the transponder 1 is within the second range of operation a2.

Then, the transponder 1 is brought closer to the reader 2 and within the second range of operation a2 so that the transponder 1 can detect signals sent by the reader 2. Then, the transponder 1 can communicate with the reader 2 by responding to detected signals.

For the exemplary embodiment, the transponder 1 may detect a further signal sent by the reader 2 while being within the second range of operation a2. This further signal may comprise an information about a new threshold voltage which is, for instance, the first threshold voltage $V_{t,1}$. Then, the integrated circuit 4 adjusts itself again such it processes signals causing a voltage V across the antenna 5 above the newly received threshold voltage $V_{t,1}$. Then, the transponder 1 detects only signals sent by the reader 2, if the transponder 1 is within the first range of operation a1.

For the exemplary embodiment, the transponder 1 has a maximum sensitivity which ist determined by the physical properties of the antenna 5 and the integrated circuit 4. The transponder 1 is further designed to receive a special reset signal sent by the reader 2. If the transponder 1 receives the reset signal, i. e. if the antenna 5 captures the reset signal, then the integrated circuit 4 processes the captured reset signal even though it may cause an antenna voltage less than the current threshold voltage. In response to the processed reset signal, the integrated circuit 4 adjusts its input sensitivity to the maximum sensitivity.

For the exemplary embodiment shown in FIGS. 1-3, the transponder 1 receives the signals comprising the information about the threshold voltages $V_{t,1}$, $V_{t,2}$. The signals can, in general, comprise an information about an input sensitivity of the transponder 1. The input sensitivity corresponds, for instance, to an input sensitivity of the integrated circuit 4. Alternatively, the signals can comprise an information about a distance within the transponder 1 shall detect received signals.

Figure 4:
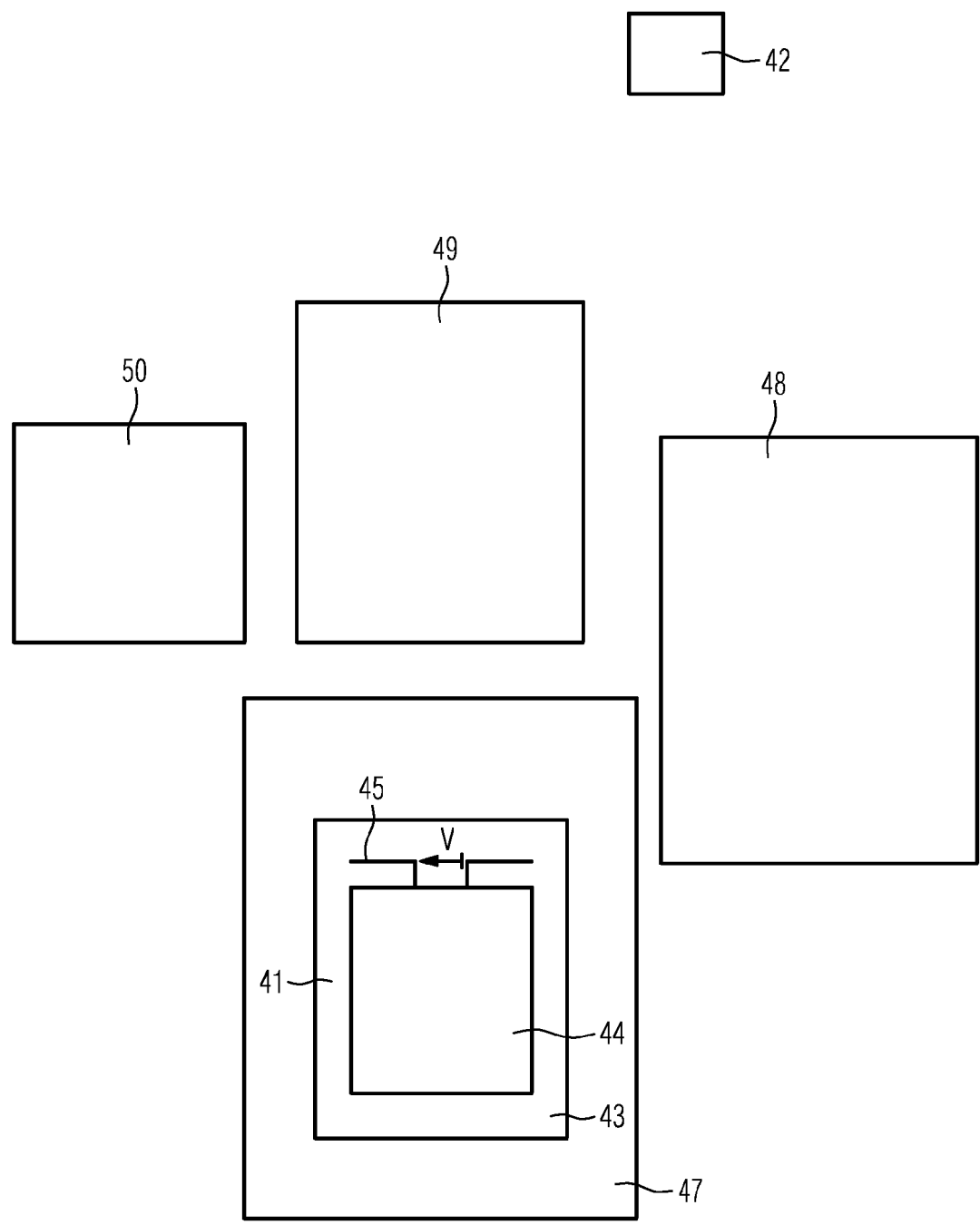
FIG. 4 shows a further transponder attached to a parcel.

FIG. 4 shows a further transponder 41 comprising a substrate 43, an integrated circuit 44, and an antenna 45 connected to the integrated circuit 44. Similar to the transponder 1 of FIGS. 1 and 2, the transponder 41 is configured to adjust its threshold voltage $V_t$ so that it detects only signals above the adjusted threshold voltage.

For the exemplary embodiment, the transponder 41 is attached to a parcel 47 or a packet. Furthermore, the transponder 41 is meant for communicating with a reader 42, if the transponder 41 is within a distance corresponding to the adjusted threshold voltage.

The parcel 47 may be placed next to parcels 48-50. These parcels 48-50 may also comprise attached transponders (not explicitly shown in FIG. 4). The parcels 48-50 may also affect the communication between the transponder 41 and the reader 42 such that they attenuate the power of signals sent by the reader 42. The parcels 48-50 may attenuate the power of the signals from the reader 42 by reducing the propagation of electro-magnetic signals. The integrated circuit 44 of the transponder 41, however, is designed for the exemplary embodiment to detect an attenuation of electro-magnetic signals within its vicinity and thus to adapt its threshold voltage $V_t$ such that it corresponds to the desired threshold voltage $V_t$ without reduced propagation. This can be achieved that the integrated circuit 44 sends signals and measures the resulting impedance. Thus, the integrated circuit 44 increases the desired threshold voltage $V_t$ by a value corresponding to the attenuation.

Finally, it should be noted that the aforementioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware.

The mere fact that certain measures are recited in mutually different dependent claims does not indicate that a combination of these measures cannot be used to advantage.

The invention claimed is:

1. A method for operating a transponder, the method comprising:
   defining an input sensitivity of the transponder such that said transponder detects only signals above a certain power corresponding to said input sensitivity, wherein the input sensitivity is adjustable and proportional to a range of operation around the transponder;
   receiving, with the transponder from a transmitter, a signal comprising a reference sensitivity;
   adjusting said input sensitivity of the transponder to said reference sensitivity to receive further signals from the transmitter while the transmitter is within the range of operation;
   with the transponder, transmitting a signal;
   with the transponder, evaluating a measured impedance corresponding to the transmitted signal;
   with the transponder, detecting an ambient attenuation of signals to be detected by said transponder based on evaluation of the measured impedance; and
   adjusting said input sensitivity of said transponder so that said input sensitivity corresponds to said reference sensitivity without ambient attenuation.

2. A method for operating a transponder, the method comprising:
   defining an input sensitivity of the transponder such that said transponder detects only signals above a certain power corresponding to said input sensitivity, wherein the input sensitivity is adjustable and proportional to a certain range of operation around the transponder;
   receiving, with the transponder from a transmitter, a signal comprising information about a distance within which said transponder shall be able to detect signals sent by said transmitter;
   adjusting said input sensitivity of said transponder so that said transponder detects only signals sent by said transmitter if said transponder is within said distance to said transmitter;
   with the transponder, transmitting a signal;
   with the transponder, evaluating a measured impedance corresponding to the transmitted signal;
   with the transponder, detecting an ambient attenuation of signals to be detected by said transponder based on the evaluation of the measured impedance; and
   adjusting said input sensitivity of said transponder so that said attenuation is compensated.

3. A transponder comprising:
   a receiver to receive signals sent by a transmitter, wherein said receiver has an input sensitivity such that said transponder detects only signals above a certain power corresponding to said input sensitivity, wherein the input sensitivity is adjustable and proportional to a certain range of operation around the transponder, and said transponder being configured to adjust said input sensitivity to a reference sensitivity in response to a received signal sent by said transmitter to receive further signals from the transmitter while the transmitter is within the range of operation, and said received signal comprising information about said reference sensitivity; and a device for transmitting a signal, evaluating a measured impedance corresponding to the transmitted signal, and detecting an ambient attenuation of signals to be detected by said transponder based on the evaluation of the measured impedance; said transponder being configured to adjust said input sensitivity so that said transponder has an input sensitivity corresponding to said reference sensitivity without attenuation.

4. A transponder comprising:

a receiver configured to receive signals sent by a transmitter; said receiver having an input sensitivity such that said transponder detects only signals above a certain power corresponding to said input sensitivity, wherein the input sensitivity is adjustable and proportional to a certain range of operation around the transponder, and said transponder being configured to adjust said input sensitivity in response to a received signal sent by said transmitter and comprising information about a distance so that said transponder detects only signals sent by said transmitter, if said transponder is within said distance to said transmitter; and a device for transmitting a signal, evaluating a measured impedance corresponding to the transmitted signal, and detecting an ambient attenuation of signals to be detected by said transponder based on the evaluation of the measured impedance, wherein said transponder is configured to adjust said input sensitivity so that said attenuation is compensable.

* * * * *